United States Patent [19]

Byrnes et al.

[11] Patent Number: 5,913,186
[45] Date of Patent: Jun. 15, 1999

[54] DISCRETE ONE DIMENSIONAL SIGNAL PROCESSING APPARATUS AND METHOD USING ENERGY SPREADING CODING

[75] Inventors: James S. Byrnes, Sharon, Mass.;
Izidor Gertner, New York, N.Y.;
Gerald Ostheimer, Goeteborg, Sweden;
Michael A. Ramalho, Wall, N.J.

[73] Assignee: Prometheus, Inc., Sharon, Mass.

[21] Appl. No.: 08/622,561

[22] Filed: Mar. 25, 1996

[51] Int. Cl.$^6$ ........................................................ G10L 3/02
[52] U.S. Cl. ........................ 704/204; 704/203; 704/229; 704/230
[58] Field of Search ................................ 395/2.12, 2.13, 395/2.14, 2.39, 2.74, 2.91–2.95

[56] References Cited

U.S. PATENT DOCUMENTS

| | | | |
|---|---|---|---|
| 4,949,383 | 8/1990 | Koh et al. | 395/2.39 |
| 4,953,214 | 8/1990 | Takeguchi et al. | 704/230 |
| 5,142,656 | 8/1992 | Fielder et al. | 395/2.38 |
| 5,184,316 | 2/1993 | Sugiyama | 364/715.02 |
| 5,301,255 | 4/1994 | Nagai et al. | 704/230 |
| 5,349,549 | 9/1994 | Tsutsui | 395/2.12 |
| 5,357,594 | 10/1994 | Fielder | 395/2.2 |
| 5,363,096 | 11/1994 | Duhamel et al. | 341/50 |
| 5,394,473 | 2/1995 | Davidson | 395/2.38 |
| 5,471,558 | 11/1995 | Tsutsui | 395/2.28 |
| 5,479,562 | 12/1995 | Fielder et al. | 395/2.38 |
| 5,506,623 | 4/1996 | Sako et al. | 348/405 |
| 5,619,197 | 4/1997 | Nakamura | 341/50 |
| 5,636,324 | 6/1997 | Teh et al. | 704/226 |

OTHER PUBLICATIONS

J. S. Byrnes, B. Saffari, and H. S. Shapiro, "Energy Spreading and Data Compression Using the Prometheus Orthonormal Set," Proceedings of the IEEE DSP Conference Loen, Norway, Sep. 1–4, 1996 (published approximately Nov. 1996).

Byrnes, "Quadrature Mirror Filters, Low Crest Factor Arrays...", Applied and Computational Harmonic Analysis 1, 261–266, 1994.

*Primary Examiner*—David R. Hudspeth
*Assistant Examiner*—Michael N. Opsasnick
*Attorney, Agent, or Firm*—Williams & Associates; Frederick C. Williams

[57] ABSTRACT

PONS comprises a transform coder and decoder for discrete time electrical signals, in particular acoustic signals. The PONS coder utilizes an integer coefficient transform coder which is not frequency based, which requires almost exclusively fast integer arithmetic, and which spreads incoming signal energy nearly as evenly as possible among coefficients in the transform domain. The PONS coder also has the property that the magnitudes of transform domain coefficients vary by less than about an order of magnitude, so that the PONS coder dispenses completely with time-varying bit allocation. PONS uses only the quantization step to achieve significant compression. Energy spreading also permits reasonably accurate signal reconstruction when significant numbers of transform coefficients are lost or corrupted.

23 Claims, 8 Drawing Sheets

DISCRETE ONE DIMENSIONAL SIGNAL PROCESSING APPARATUS AND METHOD USING ENERGY SPREADING CODING

CROSS REFERENCE TO MICROFICHE APPENDIX

This Application includes a computer program listing in the form of the Microfiche Appendix [A] which has been filed in this Application as 20 frames (exclusive of target and title frames) distributed over 1 sheet of microfiche in accordance with 37 C.F.R. § 1.96. The disclosure of the Appendix [A] is incorporated by reference into this specification. It should be noted that the disclosed source code in the Appendix [A] and the object code which results from compilation of the source code and any other expression appearing in the listings or derived therefrom are subject to copyright protection. The copyright owner has no objection to the facsimile reproduction by anyone of the patent document (or the patent disclosure as it appears in the files or records of the U.S. Patent and Trademark Office) for the sole purpose of studying the disclosure to understand the invention, but otherwise reserves all other rights to the disclosed computer listing including the right to reproduce said computer program in machine executable form and or to transform it into machine executable code.

BACKGROUND OF THE INVENTION

Manipulation of discrete time signals by means of digital coding has become a major tool in modern communications engineering. Coding is directed to such purposes as compression, noise rejection, and data security. Transform coding is one of the most common approaches.

A form of transform coding of continuous functions, orthonormal decomposition (and subsequent reconstruction), has been known since the time of Fourier. In recent years, discrete orthonormal transforms have been derived for applying analogous techniques and results to discrete time signals. Specific discrete orthonormal decompositions, for example, those using the (discrete) fast fourier transform (FFT) or the discrete cosine transform (DCT), are frequently used for electronic processing of many kinds of digitized univariate discrete time signals.

However, high speed and computational efficiency in coding and decoding of signals are key goals in designing a coding system. Methods of decomposing signals which are currently in use suffer from two inherent characteristics which limit either speed or computational efficiency or both.

The first limitation is that in FFT and DCT coding and in related systems, use of transcendental functions (e.g., sines and cosines) required in the generation of the transform coefficients generally requires copious multiplication and addition in floating point arithmetic, which is very time consuming even on high speed signal processing chips. The second major limitation is that all transform coding methods in use before the current invention, including those such as the Walsh-Hadamard transform which have binary valued coefficients (e.g., +1, −1), and do not therefore generally require floating point arithmetic, suffer from another generic limitation when used for compression purposes, namely the need for bit allocation, which is computation intensive.

One of the principal objectives in designing an efficient coding method for discrete time electronic signals is to effect a parsimonious representation of the signal. Parsimonious in this context implies minimization of the bandwidth or amount of electronic storage space necessary to store or transmit an acceptable representation or approximation of the signal.

Economy and efficiency in representation are achieved or enhanced by quantizing the transform domain coefficients—in the case of the FFT or DCT, the frequency domain coefficients. Quantization of the transform domain coefficients renders those coefficients in a much smaller number of bits than the number of bits in which the original (not-transformed) incoming signal is expressed. Quantization by itself and in combination with other properties of a given transform can produce significant compression in the representation of the signal, thereby economizing storage space or transmission bandwidth.

In addition, transforms of discrete time signals such as the DCT result automatically in frequency "binning." Other transforms such as Walsh-Hadamard, though not frequency based, nevertheless resolve the signal energy into a finite number of (non-frequency-based) transform domain bins.

Most discrete transform processing operates on time slices of the signal, called "frames," each containing a fixed number of samples of the signal. If a signal is rapidly varying in frequency or other transform domain content over time, for example an audio signal comprising music or speech, the energy in the signal is transformed to different subsets of bins in different time-separated samples of the signal depending on the varying spectrum—or transform domain content—of the incoming signal contained in the given frame. To achieve efficiency in use of digital processing resources, previous coding methods have had to address what has come to be known as the "bit allocation" problem.

The bit allocation problem arises as follows: if the coding system allocates to a transform domain bin with low energy content a number of bits equal to the number of bits allocated to a transform domain bin with a high energy content, a large fraction of the bits allocated to the low energy content bin are not mathematically significant (and therefore contain little information in the information theory sense) and hence need not be used or stored. Thus, the storage and processing resources in the low energy bins are not utilized efficiently. Bit allocation methodologies have been devised to address this situation.

For all orthogonal transform coding techniques, it has been shown that "the optimal bit allocation strategy is such that variances of all quantizer noise sources are equalized." P. P. Vaidyanathan, "Multirate Systems And Filter Banks" (PTR Prentice Hall, Inc., Englewood Cliffs, N.J. 1993), p. 821. The result is that in actual practice differing numbers of bits are assigned to different transform domain bins according to the transform domain energy content of the signal. If the transform domain energy distribution varies rapidly with time, the optimal bit allocation coding method just described ideally follows the variation with a rapidly changing bit allocation, preferably even on a frame by frame basis.

The computations necessary for optimizing bit allocation in transform coding can be quite complex, however. N. S. Jayant and P. Noll, "Digital Coding of Waveforms" (Prentice Hall, Inc., Englewood Cliffs, N.J. 1984), sections 12.4 and following. Optimization requires knowledge of the statistical properties of the incoming signal. Moreover, if bit allocation is to be adaptive, that is, if it is to follow closely a rapidly time-varying energy distribution, such as that of music or speech, the process is computationally intensive. In sophisticated applications, computing the bit allocation typically absorbs greater than one half of the computing power available for processing the signal.

The need for economy sometimes precludes performing such bit allocation calculations in real time. In some applications it is not technically or economically feasible to devote the computing resources necessary to perform bit allocation calculations every frame. As a result, bit allocation is far from optimal much of the time if the input signal power distribution is not nearly stationary.

Bit allocation which is frequently incorrect leads to a particularly vexing aliasing problem associated with binning. In this situation the aliasing error in a given frequency or transform domain bin is determined by the manner of quantizing adjacent bins. To solve this problem within the available computing resource allocation, engineers resort to methods to limit the distortion introduced into the reconstructed signal by the quantization at adjacent transform domain bins by differing numbers of bits.

Slowly varying bit allocation (i.e., not frame by frame) also fails to guarantee against data overflow in some transform domain bins. Indeed, if bit allocation is not done every frame, there is a significant likelihood of overflow in one or more transform domain bins. Overflow gives rise to nonlinear clipping of the transform domain coefficient. Clipping can produce electronically and aesthetically significant distortion in the reconstructed output signal.

The two sources of distortion, aliasing and clipping, can produce significant and usually unrecoverable degradation in the reconstructed signal. There is thus a need for a transform coding technology which avoids the bit allocation problem altogether. The current invention avoids this problem altogether by spreading energy more or less evenly across transform domain bins so that bit allocation need not be time varying.

There are also some applications, e.g., spread spectrum transmission, in which it would be advantageous to spread the signal energy out more or less evenly among all the transform domain bins. One advantage of an appropriate method of energy spreading would be that no one transform domain coefficient is more significant than any other. In this case, the signal could be approximately reconstructed even if one or a few transmission bands were degraded or lost. In contrast, losing a high energy coefficient in a traditional transform coding technique (e.g., the DFT) would be catastrophic to reconstructing the signal. No prior coding method has been found which has such energy spreading properties and binary valued coefficients. In fact, the Walsh-Hadamard transform, which has one advantage of the present invention, namely binary valued coefficients, is particularly unsuitable for energy spreading: indeed, for a very broad class of natural input signals, the Walsh-Hadamard transform can be shown to have extremely uneven distribution of energy among transform domain bins.

An essential object of the present invention, therefore, is to provide a new method and apparatus for coding and decoding of digital signals which provide a representation of the input signal using a novel decomposition of the incoming signal that is not based on frequency. A further object is to provide a method of signal coding and decoding using a novel decomposition of the signal in which the dominant computations in the signal processing platform use only integer add and subtract operations, thereby providing a high degree of speed and efficiency in operation. It is a further object of the invention to provide a novel signal decomposition which spreads the energy of the incoming signal reasonably evenly over the transform domain bins. It is a further object of the invention to use the energy spreading property to enhance signal compression. It is another object of this invention to produce a coding method for discrete time signals for the compression application in which there is no bit allocation computation. It is yet another object of this invention to enable uniform quantization for all transform domain bins. It is yet a further object of this invention to produce a coding method for discrete time signals for the compression application which eliminates both adjacent bin aliasing and clipping of transform domain coefficients. It is another object of this invention to provide an energy spreading coding method which can be used in spread spectrum applications. It is yet a further object of this invention to provide an energy spreading filter bank which is a quadrature mirror filter.

SUMMARY OF INVENTION

The present invention is an easily implemented fast digital method of signal coding and processing which is useful for signal processing applications involving rapidly varying incoming signals such as acoustic signals and which offers benefits including speed, energy spreading, low demand for computing power, and ease of application. This method offers speed because coding and decoding are performed almost exclusively using integer add and subtract operations.

The method and apparatus of this invention are based on a new coding basis which we call the Prometheus Orthonormal Set (PONS). This invention uses a finite symmetric matrix decomposition of the discrete signal frame in which the decomposing matrices are orthonormal, as in prior transform methods. In addition, as with the Walsh-Hadamard transform, the method of this invention uses binary valued coefficients, namely plus and minus ones, as elements of the orthonormal decomposition matrix.

Since the discrete time input signals are typically represented in binary integer format, though with a relatively large number of bits per sample, the fundamental coding and decoding operations will utilize exclusively a set of integer adds and subtracts. The current invention thus provides great improvement in computational speed for any given processor over transforms such as the DCT, which requires multiply and add operations, and the FFT, which uses complex multiply and add operations (one complex add operation requires two scalar adds; one complex multiply operation in rectangular coordinates requires 4 scalar multiplications and two scalar adds). In addition, both the DCT and the FFT are typically implemented using floating point arithmetic to maintain the necessary precision. See, for example, Fielder, et al., U.S. Pat. No. 5,230,038, Jul. 20, 1993.

The method of the current invention also has the property, like wavelet transforms, that it is fundamentally suited to processing highly transient signals. However, it requires significantly less computation than wavelet transform methods. Moreover, wavelet transforms also generally require bit allocation computations in a compression application, and many wavelet transforms also suffer from the limitation of floating point arithmetic.

In the current invention the signal energy is spread nearly as evenly as possible over the transform domain coefficients. Accordingly, the variability in magnitudes of coefficients is drastically reduced. Thus one can establish a standard level of bit allocation for all channels at a given frame, thus eliminating bit allocation calculations and associated book-keeping. One way to implement this approach is to use uniform quantization over all channels. In this implementation one can use the identical quantization scheme for all transform domain coefficients. This method effects signal compression while completely avoiding the problem of computing bit allocations necessary in other transform coding methods, even Walsh-Hadamard.

Unlike the Walsh-Hadamard transform, moreover, the method of this invention spreads signal energy nearly as evenly as possible over all transform domain bins. Expressed most generally, this invention comprises: apparatus for coding and decoding a stream of univariate discrete-time signal samples comprising means for accumulating a complete frame of discrete-time samples from a sequential discrete time signal stream; an energy spreading block coder the output of which is a frame-sized set of transform coefficients; means for storing or transmitting a frame-sized set of transform coefficients; an energy spreading inverse block coder identical to said energy spreading block coder, the input of which is a frame-sized set of transform coefficients and the output of which is a frame-sized set of reconstructed discrete time signal samples; and a sequentializer means for converting said frame-sized set of reconstructed discrete time signal samples to a set of time-sequential reconstructed discrete time signal samples. This invention may additionally comprise, at the output side of said energy spreading block coder, means for quantizing all transform coefficients with no bit allocation and means for compensating for input signal slope rolloff.

This property may also be exploited with advanced quantization schemes (e.g., vector quantization) to give enhanced signal compression, although the current embodiment does not exploit this potential advance.

Finally, the technology of this invention can be embodied inexpensively in dedicated very fast chips. Alternatively, it can be configured to operate in real time on current generation general purpose hardware (e.g., personal computers).

DESCRIPTION OF INVENTION AND PREFERRED EMBODIMENTS

Figure 1:
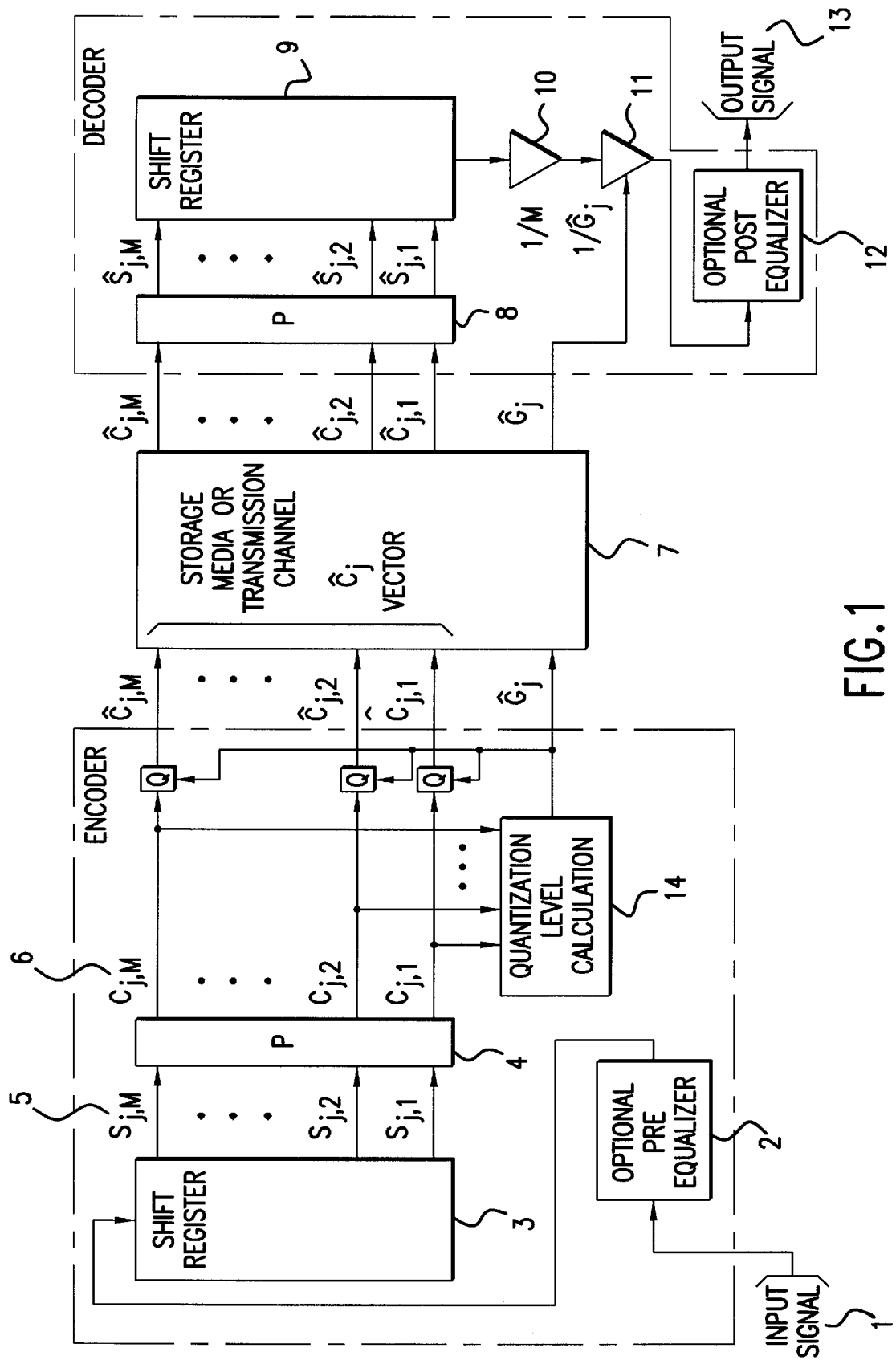
FIG. 1 shows a block diagram of the block coder representation of the PONS coding apparatus.

The Prometheus Orthonormal Set (PONS) transform matrices upon which this invention is based are derived from a set of polynomials $$\{P_{n,m}\}: n \geq 0, 0 < m \geq M = 2^n \tag{1}$$

The number n is the order of the decomposition, e.g., 7, and the number M is the corresponding maximum value of the subscript m, for n=7, 128. M also determines the frame size for the frames of the incoming signal to be processed. The polynomials, which are of degree M-1, are generated by a minor modification to the recursion as derived in J. S. Byrnes, "Quadrature Mirror Filters, Low Crest Factor Arrays, Functions Achieving Optimal Uncertainty Principal Bounds, and Complete Orthonormal Sequences—a Unified Approach," Applied and Computational Harmonic Analysis 1, 261–266 (1994). Starting with $$P_{1,1}(z)=1+z$$

$$P_{1,2}(z)=1-z \tag{2}$$

the recursion relations

Given $P_{n,m}(z)$, $m=1, 2, \ldots, 2^n$ for $m=4j+1$, with $j=0, 1, 2, \ldots, 2^{n-1}-1$ define $P_{n+1,m}(z)$, $m=1, 2, \ldots, 2^{n+1}$ as  (3)

$$P_{n+1,m}=P_{n,2j+1}+Z^{2n}P_{n,2j+2}$$

$$P_{n+1,m+1}=P_{n,2j+1}-z^{2n}P_{n,2j+2}$$

$$P_{n+1,m+2}=P_{n,2j+2}+z^{2n}P_{n,2j+1}$$

$$P_{n+1,m+3}=-P_{n,2j+2}+z^{2n}P_{n,2j+1} \tag{4}$$

define the complete set of polynomials ($P_{n+1,m+3}$ in the current embodiment is −1 times $P_{n+1,m+3}$ in the cited reference in order to make the transform matrices symmetric while preserving the desired properties of the transform.) For n+1=2, n=1, $2^{n-1}-1=0$, j=0 only, hence m=1 only, and we have $$P_{2,1}(z)=P_{1,1}(z)+z^2P_{1,2}(z)=(1+z)+z^2(1-z)=1+z+z^2-z^3$$

$$P_{2,2}(z)=P_{1,1}(z)-z^2P_{1,2}(z)=(1+z)-z^2(1-z)=1+z-z^2+z^3$$

$$P_{2,3}(z)=P_{1,2}(z)+z^2P_{1,1}(z)=(1-z)+z^2(1+z)=1-z+z^2+z^3$$

$$P_{2,4}(z)=-P_{1,2}(z)+z^2P_{1,1}(z)=-(1-z)+z^2(1+z)=-1+z+z^2+z^3 \tag{5}$$

In the order two (four component decomposition) case with the polynomials given above, the transform matrix is constructed using the coefficients of $P_{n,m}$ as the rows:

$$P = \begin{vmatrix} 1 & 1 & 1 & -1 \\ 1 & 1 & -1 & 1 \\ 1 & -1 & 1 & 1 \\ -1 & 1 & 1 & 1 \end{vmatrix} \tag{6}$$

For order 3, we would have n=2, j=0 or 1, m=1 or 5, and construction proceeds according to the recursion relations.

The coding and decoding processes are simply described for the order two (four rows and four columns) matrix constructed above. The j-th frame of a discretized signal four samples long can be represented as a matrix vector $S_j$. For n=2, $S_j$ would have four elements:

$$S_j = \begin{vmatrix} s_{j,1} \\ s_{j,2} \\ s_{j,3} \\ s_{j,4} \end{vmatrix} \tag{7}$$

The coding process is represented analytically by matrix multiplication $C_j=P\times S_j$, where $C_j$ is the vector of transform coefficients for that frame. The inverse process, namely recovering the original signal from the transform, is also represented by a matrix multiplication, this time of the transform vector $C_j$ by the transpose of the transform matrix $P^T$. However, since P is symmetric, $P^T$ is identical with P, so that:

$$S_j = \left(\frac{1}{2^M}\right) P \times C_j$$

The normalization factor $\frac{1}{2}^M$ can be inserted anywhere in the process. In the current preferred embodiment it is applied on the reconstruction side.

A substantially identical coding process is achieved with straightforward modifications of the matrix elements, such as multiplication of rows by −1 or reordering of rows. In such cases, the actual transpose must be used for decoding.

In one current preferred embodiment the coding and decoding operations are implemented as block coders. FIG. 1 shows the block coder process of coding and decoding for an M component (M is $2^n$, where n is the order of the PONS coding) implementation. The transform matrix P is constructed from the coefficients of the appropriate $P_{n,m}$ polynomials, as done in the four component decomposition above. The basic coding and decoding of signals are formally integer matrix multiplication operations but are implemented simply via add and subtract operations.

In actual practice, the block coder is typically not a matrix multiplier. A key element of the current invention is the development of a fast algorithm for its implementation. This fast transform enables or enhances, depending on the hardware in which it is implemented, real time operation.

A naive articulation of the PONS transform $C_j = P \times S_j$ (where P is the PONS matrix of order n) as a matrix multiplication requires on the order of $M^2$, or $2^{2n}$, basic operations for a frame $S_j$ of $M=2^n$ samples. However, the basic approach to developing fast algorithms for transforms has been known since the work of Cooley and Tukey. See Cooley, P. M., and Tukey, J. W., "An Algorithm for the Machine Computation of Complex Fourier Series," *Mathematics of Computation*, Vol. 19 (April 1965), 297–301. Oppenheim and Schafer explain this method in considerable detail, showing that such methods and algorithms have a tree structure. Oppenheim, Alan V., and Schafer, Ronald W., *Digital Signal Processing* (Prentice Hall, Englewood Cliffs, N.J., 1975), Chapter 6. The fast algorithm transforms a frame of a signal using only $M*\log_2 M$, or $n*2^n$, basic operations. Even for fourth order, namely a frame size of 16, the fast algorithm is a factor of four more efficient.

The principle of the fast method is as follows. Consider a frame of $M=2^n$ samples split into two column vectors $S_{j,1}$ and $S_{j,2}$ of length $2^{n-1}$. For four consecutive coefficients of the column vector $C_1 = P_{n+1} \times S_1$, we have according to the recursive definition (omitting the frame subscript 1 to reduce confusion):

$C_{4j+1} = P_{n+1,4j+1} \times S = P_{n,2j+1} \times S_1 + P_{n,2j+2} \times S_2$ $C_{4j+2} = P_{n+1,4j+2} \times S = P_{n,2j+1} \times S_1 - P_{n,2j+2} \times S_2$ $C_{4j+3} = P_{n+1,4j+3} \times S = P_{n,2j+2} \times S_1 + P_{n,2j+1} \times S_2$ $C_{4j+4} = P_{n+1,4j+4} \times S = -P_{n,2j+2} \times S_1 + P_{n,2j+1} \times S_2$ In other words, we require an addition for each of M coefficients, as well as the values of the following four terms:

$P_{n,2j+1} \times S_1$, $P_{n,2j+1} \times S_2$, $P_{n,2j+2} \times S_1$, and $P_{n,2j+2} \times S_2$.

But these are just some of the coefficients of the matrix product $P_n \times S_1$ and $P_n \times S_2$, which we can compute in the same manner by subdividing the input vector, using one addition per coefficient plus computation of simplified terms. This recursion ends after $n = \log_2 M$ steps, with n times M additions per frame. In addition to affording a considerable speed advantage, this method does not require the M by M transform matrix to be physically present in the transformation mechanism, resulting in simplified hardware implementations. Thus the actual block coder used in the preferred embodiment represents a tree structured fast algorithm with information flow similar to those shown in Oppenheim and Schafer, Chapter 6.

With reference to FIG. 1, the incoming sampled signal 1 first passes through an optional preequalizer 2. This optional pre-equalizer can be a simple filter (e.g., $D(z) = 1 - \alpha z^{-1}$, $0 \leq \alpha < 1$) to compensate for the slope rolloff of anticipated input signal classes. The preequalized signal samples are then accumulated into input frames $S_j$ by a device such as a shift register 3. Upon the filling of the shift register or other frame accumulation means, the operation of matrix multiplication 4, $P \times S_j$, takes place in device 4, producing a frame set of transform domain coefficients 5, $C_j = [c_{j,1}, c_{j,2}, \ldots, c_{j,M}]$. In actual implementation, since the transform matrix elements are uniformly + or −1, matrix multiplication reduces to changing the sign bit of one or more components of the input signal vector according to the differing coefficients of each row and adding in integer arithmetic, which produces a very fast coding operation.

Signal compression is achieved in this embodiment by quantizing the coefficients of the transform domain vector. Quantization is performed by a bank of quantizers 6. These output a set of quantized coefficients $\hat{C}_j = [\hat{C}_{j,1}, \ldots, \hat{C}_{j,M}]^T$ to the transmission or storage medium 7 along with a gain scaler $G_j$ to be described below.

For reconstruction, the transmission or storage medium 7 transfers the coefficients to the inverse operation block 8 just as the accumulation device 3, e.g., shift register, transferred $S_j$ to P at device 4. The output of the inverse transformation operation P transfers into an inverse accumulation device 9, e.g., again depicted as a shift register, which outputs the reconstructed signal $\hat{S}_j = P\hat{C}_j$ sequentially into the transmission stream. At this point, a divide by M operation 10 takes place to provide the normalization factor $\frac{1}{2}^k$. Since division by powers of two are shifts in binary arithmetic, this division may be accomplished by a shift operation. Subsequently, the effects of the quantization level scaler G must be compensated for by multiplication by 1/G in device 11. Finally, if the optional pre-equalizer 2 is used, then an optional post-equalizer 12 compensates with a characteristic inverse to the optional preequalizer to regain the original spectral distribution.

A significant feature which can enhance the performance of this invention is to insert a quantization level calculation 14 before the quantization step in order to utilize fully the input dynamic range of the quantizers. Due to the energy spreading property of the PONS transform, the transform domain coefficients are usually tightly bounded. In practice, this property results in the coefficients being close to each other in magnitude in the dynamic range sense. In view of this property, the current embodiment of the invention simply finds the transform domain coefficient $C_{j,m}$ with the largest absolute value and calculates a quantizer level threshold G that scales that $C_{j,m}$ such that it occupies the most positive or most negative quantization level of the quantizer Q. All quantizers use this identical threshold level G. Since all remaining $C_{j,m}$ are smaller in absolute value, none of the remaining coefficients will be clipped. The quantizer level adjustment must be removed from the final signal and this operation is done at the inverse quantizer level operator 11.

Quantization takes place for each transform domain coefficient. In one embodiment we have used a four bit mid-riser quantizer. The $\hat{C}_{j,m}$'s (quantized $C_{j,m}$'s) are transmitted as four bit coefficients. The basic mid-riser uniform quantizer is well known in the art of digital signal processing. (See N. S. Jayant and Peter Noll, "Digital Coding of Waveforms, Principles and Applications to Speech and Video," p. 117, Prentice Hall, N.J., 1984).

Although direct hardware implementations could be created in a similar or equivalent manner to the architecture shown in FIG. 1, a software implementation may embody this architecture without some of the specific components (e.g., the shift register). The computer programs contained in the Microfiche Appendix are generally consistent with the architecture shown in FIG. 1. There are two programs in Appendix A, one for encoding and one for decoding. The encoding program processes the input signal in frames of M samples ($M=2^n$) and does not contain a separate embodiment of shift register 3. Rather, the preequalizer 2 built into the code is designed to filter the input in frames. The encoder output is a compressed file contained in storage medium 7.

The decoding program takes, as its input, the compressed file and produces the output signal file. Just as on the input side, the decoding program does not contain an explicit embodiment of the inverse accumulation device or shift register 9 and the post-equalizer 12 has been designed to process signal frames.

In addition, as the placement of the scaling factors $1/G_j$ and $1/M$ may be anywhere in the signal path, these scaling factors are not implemented in the code precisely as shown in FIG. 1. Rather, for efficiency and execution speed, the $1/G_j$ factor is scaled (i.e., multiplied) into each $\hat{C}_{j,m}$ prior to the multiplication by P in device 8 and the $1/M$ scale factor is incorporated into the processing in the post-equalizer. As a final note, signal scaling, a well known art in discrete-time signal processing and not shown in FIG. 1, is used in both the encoding and decoding software in order to keep nearly all processing in integer format.

This invention has the fundamental benefit that all transform domain coefficients are quantized to the same precision. Thus there is no bit allocation calculation whatsoever. Because of this feature, aliasing errors are canceled to the same precision in all transform domain subspaces. Further, quantization noise appears in the reconstructed signal as Gaussian noise because reconstruction produces a linear combination of quasi-random uniformly distributed errors. (Linear quantizer error is usually modelled as a uniformly distributed error over +/-Q/2, where Q is the quantization level.)

Non-linear and non-uniform quantization according to the statistics of the transform domain coefficients could also be designed although that feature is not a part of the current embodiment. For example, well known companding or vector quantization techniques could be used to potentially improve the performance of this invention even further.

Some of the most significant properties of this invention can be seen by looking at the matrix transformation in a different light. The analysis below describes a framework whereby exactly the same transform domain coefficients $C_{j,m}$ are derived, but in a filtering context. In this framework, the energy spreading property of the coder becomes more apparent. The energy spreading property has been established mathematically for wide classes of naturally occurring signals. However, for the purposes of this invention it appears more appropriate to describe these properties in an engineering context.

The polynomials from which the transform coefficients were derived were polynomials in z. If we substitute $z \rightarrow z^{-1}$, we obtain, for example, instead of the polynomials of Eq. 5, the following:

$$P_{2,1}(z^{-1}) = 1 + z^{-1} + z^{-2} - z^{-3}$$

$$P_{2,2}(z^{-1}) = 1 + z^{-1} - z^{-2} + z^{-3}$$

$$P_{2,3}(z^{-1}) = 1 - z^{-1} + z^{-2} + z^{-3}$$

$$P_{2,4}(z^{-1}) = -1 + z^{-1} + z^{-2} - z^{-3} \quad (8)$$

In addition, the transform can be written in matrix form as (for order 3):

$$P = \begin{vmatrix} P_{3,1} \\ P_{3,2} \\ P_{3,3} \\ P_{3,4} \\ P_{3,5} \\ P_{3,6} \\ P_{3,7} \\ P_{3,8} \end{vmatrix}$$

with row vectors given by $$P_{3,1} = [+1+1+1-1+1+1-1\ +1]$$

$$P_{3,2} = [+1+1+1-1-1-1+1\ -1]$$

$$P_{3,3} = [+1+1-1+1+1+1+1\ -1]$$

$$P_{3,4} = [-1-1+1-1+1+1+1\ -1]$$

$$P_{3,5} = [+1-1+1+1-1+1+1\ +1]$$

$$P_{3,6} = [+1-1+1+1+1-1-1\ -1]$$

$$P_{3,7} = [-1+1+1-1+1-1+1\ +1]$$

$$P_{3,8} = [+1-1-1-1+1-1+1\ +1]$$

This change in notation makes it apparent that each row of the transform matrix can be viewed as a digital filter the transfer function of which is given by the polynomials of Equation 8, with the $z^{-1}$ variable representing the standard unit delay line of signal processing notation. One of us showed in J. S. Byrnes, "Quadrature Mirror Filters, Low Crest Factor Arrays, Functions Achieving Optimal Uncertainty Principle Bounds, and Complete Orthonormal Sequences—a Unified Approach," Applied and Computational Harmonic Analysis 1, 261–266 (1994) that the filter bank comprising the filters having these transfer functions is a quadrature mirror filter bank for all orders.

Figure 2:
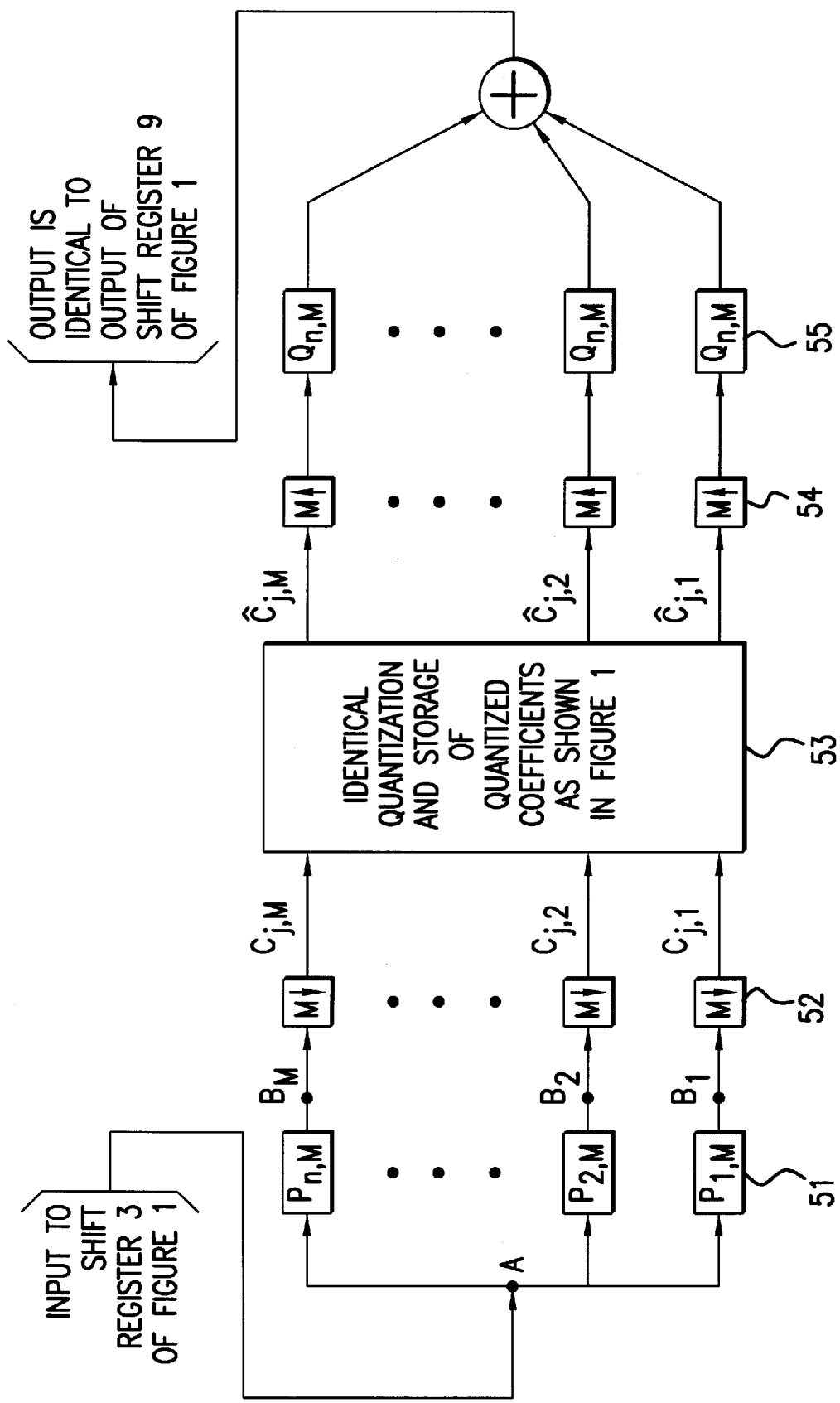
FIG. 2 shows the filter bank implementation of the PONS coding apparatus.

Thus the coding process can also be viewed as sending the input signal $S_j$ through a multiphase filter bank with the filters comprising the transform matrix rows $P_{n,m}$, $m=1, 2, \ldots 2_n$. See P. P. Vaidyanathan, "Multirate Systems And Filter Banks" (PTR Prentice Hall, Inc., Englewood Cliffs, N.J. 1993), pp. 428–429. FIG. 2 shows the coding process as a quadrature mirror filter (QMF) filter bank implementation with the input signal coming into the filters 51 directly (i.e., without the shift register 3 of FIG. 1.

The decimators 52 following the filter bank 51 produce a vector $C_j$ equivalent to the output of the matrix operation of FIG. 1 at step 5 (assuming that the phasing of the decimators 52 is such that the $C_{j,m}$'s so captured are derived from the identical set of past data as would have been captured by the shift register 3 at FIG. 1). Stated differently, assuming correct phasing at the decimators, the system of FIG. 2 produces exactly the same $C_{j,m}$'s, but provides an important engineering insight into the properties of the transform.

The interpolators 54 before the inverse operation filter bank 55 produce the output stream. The decimators and interpolators are required to make the QMF representation correspond exactly with the block coder of FIG. 1. The inverse synthesis filters $Q_{n,m}$ have an impulse response which is a time reversed version of the $P_{n,m}$'s.

Figure 3:
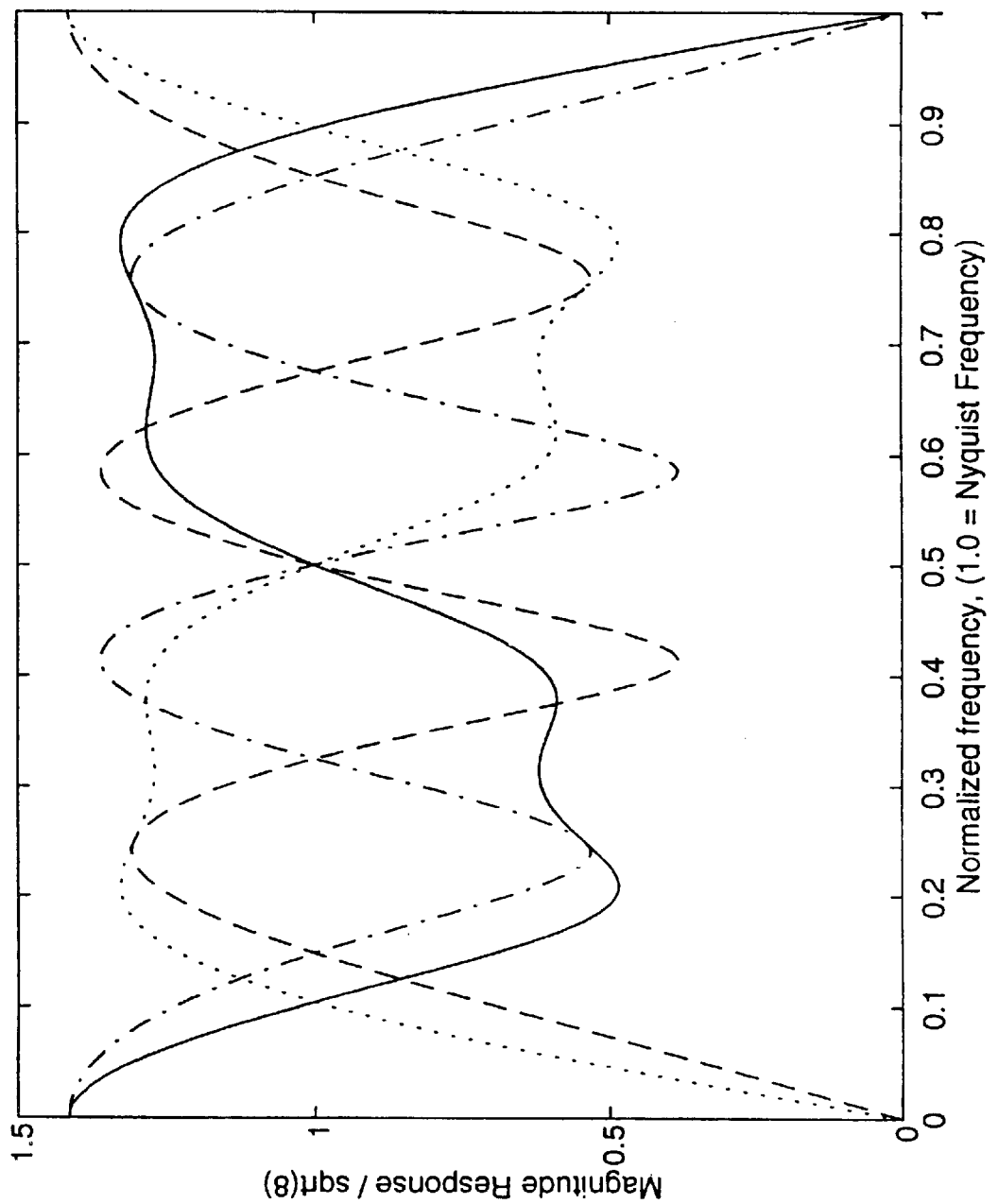
FIG. 3 displays the magnitude of the normalized transfer functions for the four stage PONS filter bank.

The energy spreading property can be seen by examining the magnitude response at each $P_{n,m}$ filter from the input side of the filter to just before the decimator (i.e., from A to $B_M$ in FIG. 2). It is a straightforward calculation to derive these; normalized magnitude responses of the four unique filters of the eight-filter bank model (i.e., n=3, M=$2^n$=8) are shown in FIG. 3. We note that after normalization by $1/\sqrt{M}$ these possess a peak gain of $\sqrt{2}$.

For single frequency sinusoids, we can state that any output $C_{j,m}$ is bounded by $\sqrt{2}$ times the quadratic mean (RMS) of the coefficients (i.e., $|C_{j,m}| \leq \overline{C}\sqrt{2}$ for m=1,2, ..., M, where $$\overline{C}_j = \frac{1}{M}\sqrt{\sum_{m=1}^{M} C_{j,m}^2}\ ).$$

Such bounding can be mathematically proven for single-frequency sinusoids, piecewise continuous linear functions comprising different sinusoids, or linear or quadratic functions with a small (compared to M) number of segments.

Since virtually all naturally occurring signals can be decomposed into elementary signals such as these (or superpositions of these), each transformation of such elementary signals will possess their bound and energy spreading property. Although a sum of such transformed signals is not guaranteed to possess such a bound, it has been found in practice that this summation tends to further equalize the magnitude of the transform domain coefficients. The PONS transform has been demonstrated to possess this whitening property in practice all naturally-occurring signals studied.

The energy spreading property becomes more evident upon examination of the transfer functions for the PONS QMF filter banks. For the eight-filter bank model (n=3, M=$2^n$=8), FIG. 3 shows the normalized (by $1/\sqrt{8}$) magnitude of the transfer functions of the first four PONS filters of FIG. 2: $P_{3,1}$ $P_{3,2}$, $P_{3,3}$, and $P_{3,4}$. As $P_{3,5}$ through $P_{3,8}$ are time reversed or time reversed and scaled by –1 versions of the first four, their transfer function magnitudes are not different from the first four.

Figure 4:
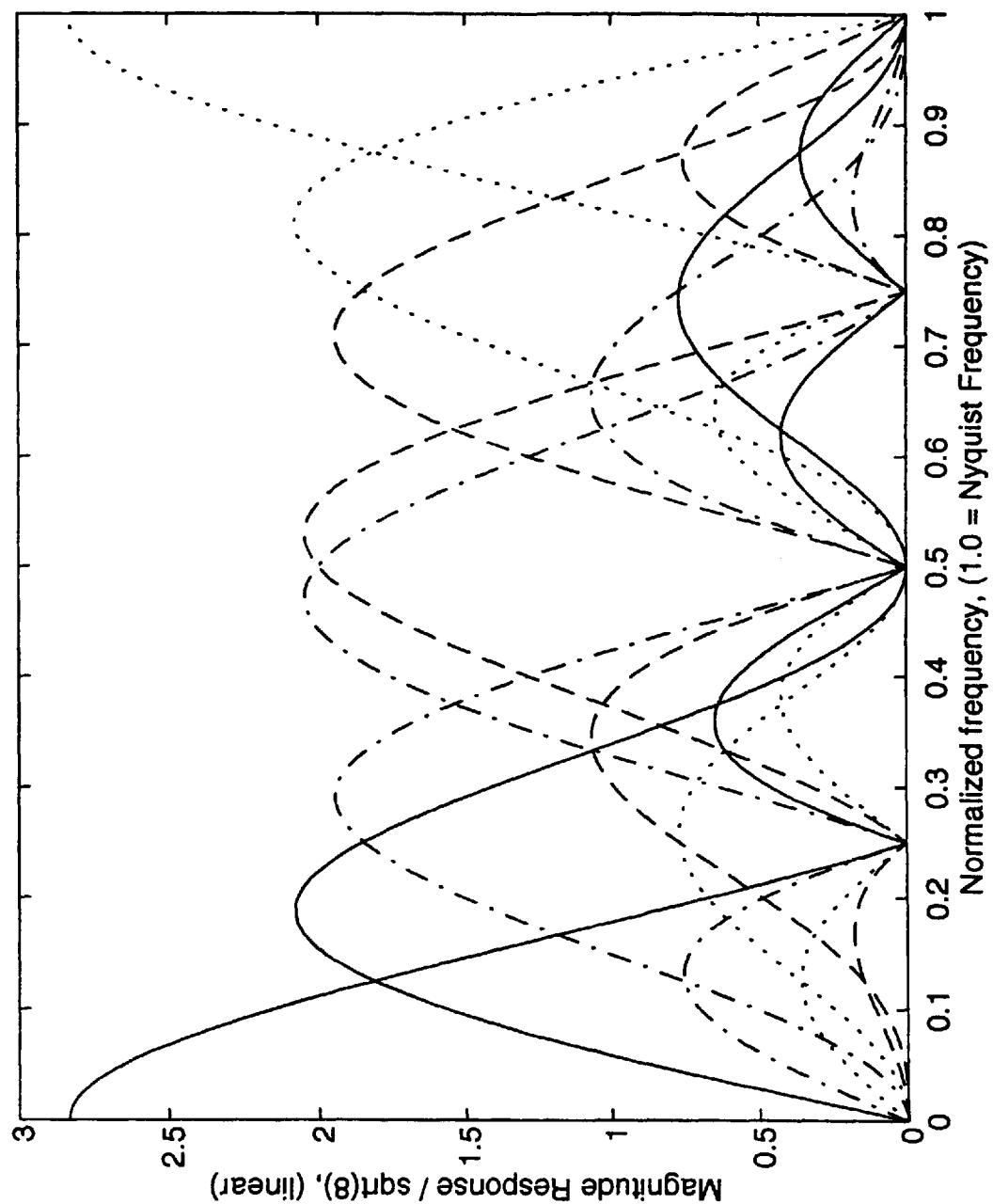
FIG. 4 displays the magnitude of the normalized transfer functions for the eight stage Walsh-Hadamard filter bank.

FIG. 4 presents the Walsh-Hadamard transfer functions for a filter bank identically normalized (by $1/\sqrt{8}$) and of the same order. (There are 8 unique magnitude functions for the Walsh-Hadamard filters.) Easily seen is the greater frequency selectivity and much higher variation in magnitude of the individual transfer functions. Using the identical methodology to the above, the Walsh-Hadamard decomposition coefficients can be expected to have more disparate magnitude variation.

Figure 5:
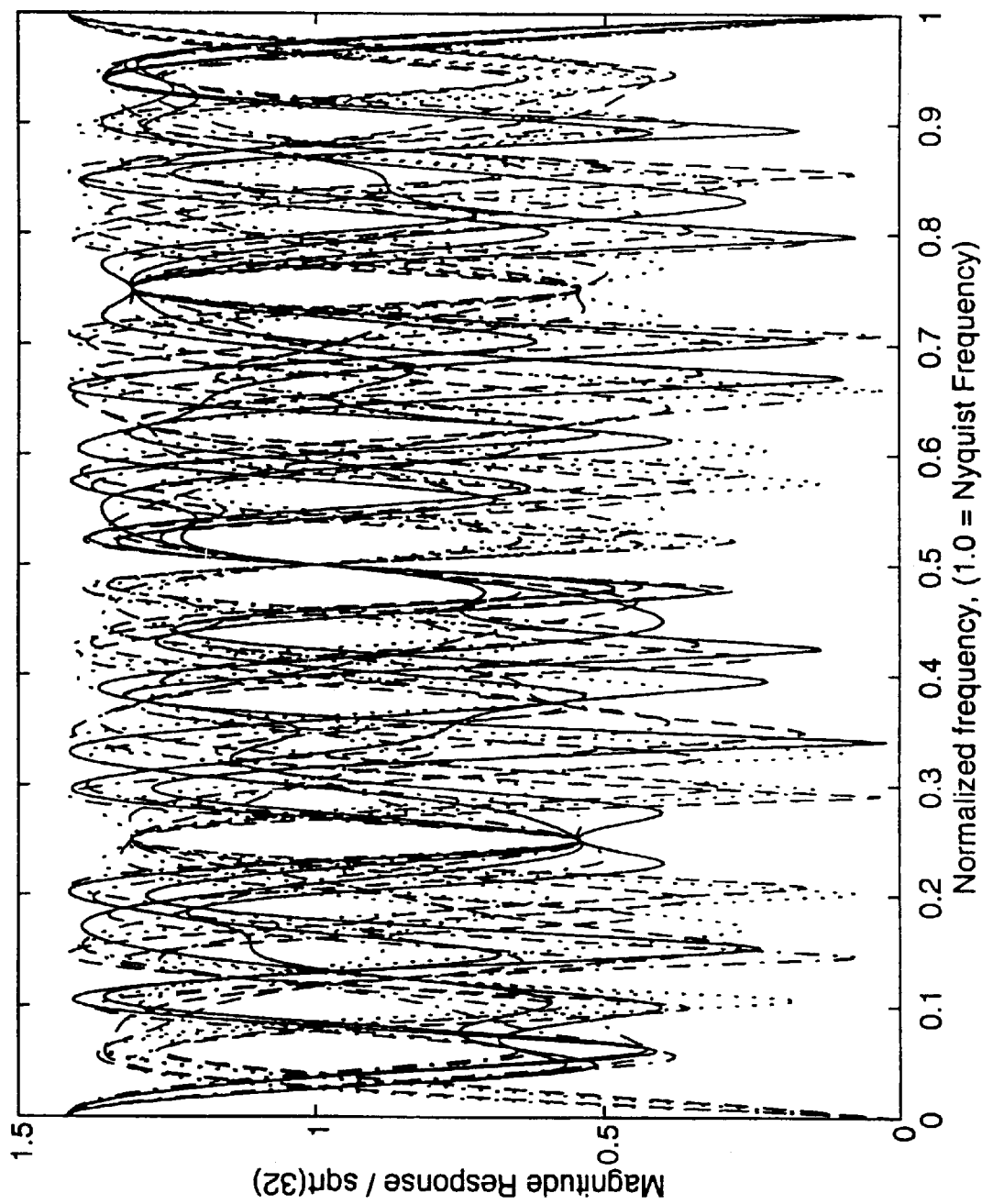
FIG. 5 displays the magnitude of the normalized transfer functions for the 32 stage PONS filter bank.
Figure 6:
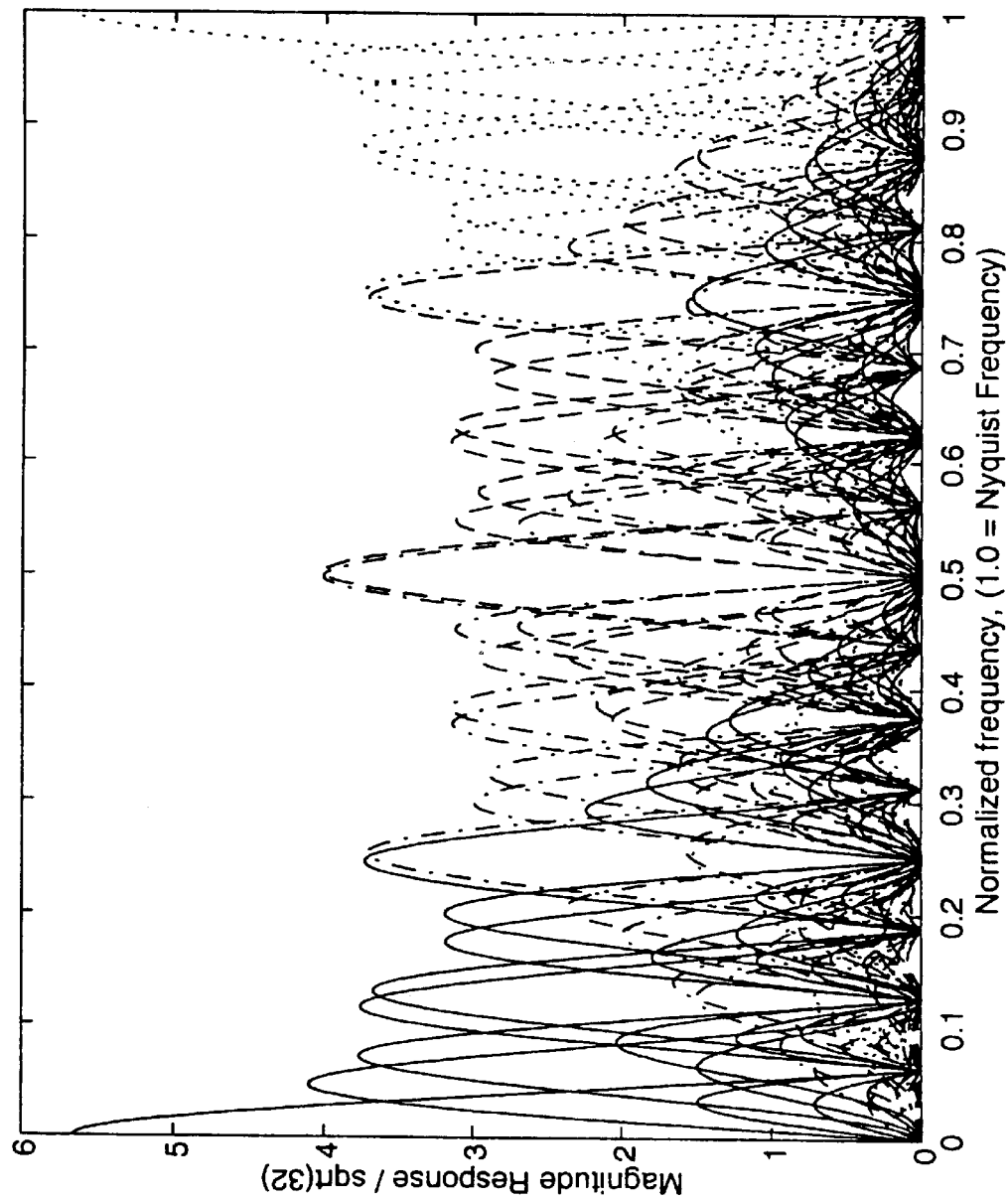
FIG. 6 displays the magnitude of the normalized transfer functions for a 32 stage Walsh-Hadamard filter bank.

The 16 unique transfer functions for a PONS QMF for a frame size and filter bank order of 32 are shown in FIG. 5. Note the $\sqrt{2}$ bound. FIG. 6, by contrast, is the Walsh-Hadamard decomposition for order 32 whence an even higher frequency selectivity and variation in magnitude may be seen. These relationships further confirm the $\sqrt{2}$ bound for the PONS transfer function magnitudes and thus the energy spreading nature of this filter bank.

Our first implementation of this invention was in a high-level language program which ran in near real time on a personal computer. Subsequent versions, written in the C language and almost exclusively in integer arithmetic, have been coded. A listing of the most recent and best mode embodiment of that program is provided in the microfiche Appendix.

Figure 7:
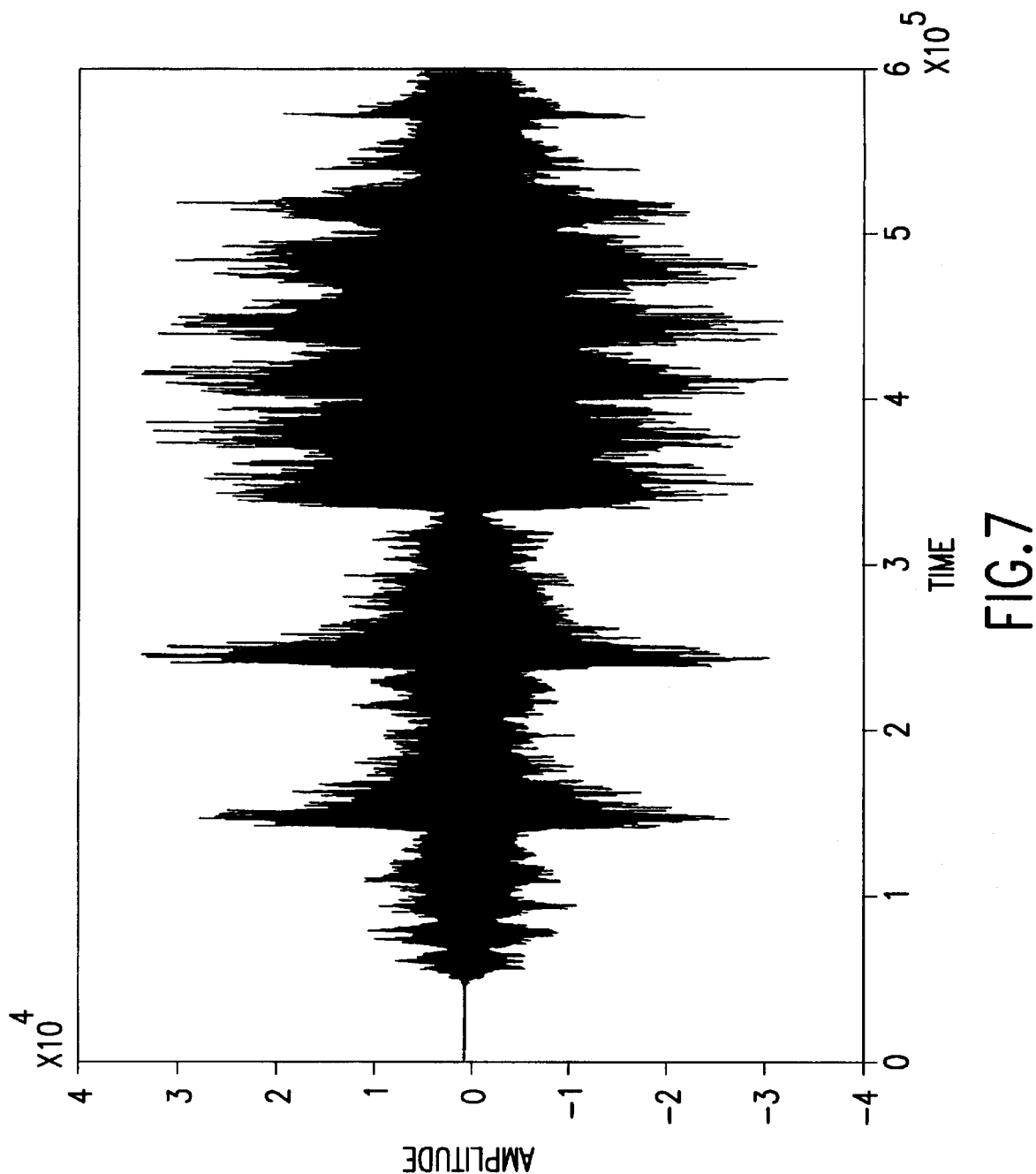
FIG. 7 is a graph of a 44.1 KHz 16 bit waveform of 14 seconds of the opening sequence of Tchaikovsky's Piano Concerto No. 1.
Figure 8:
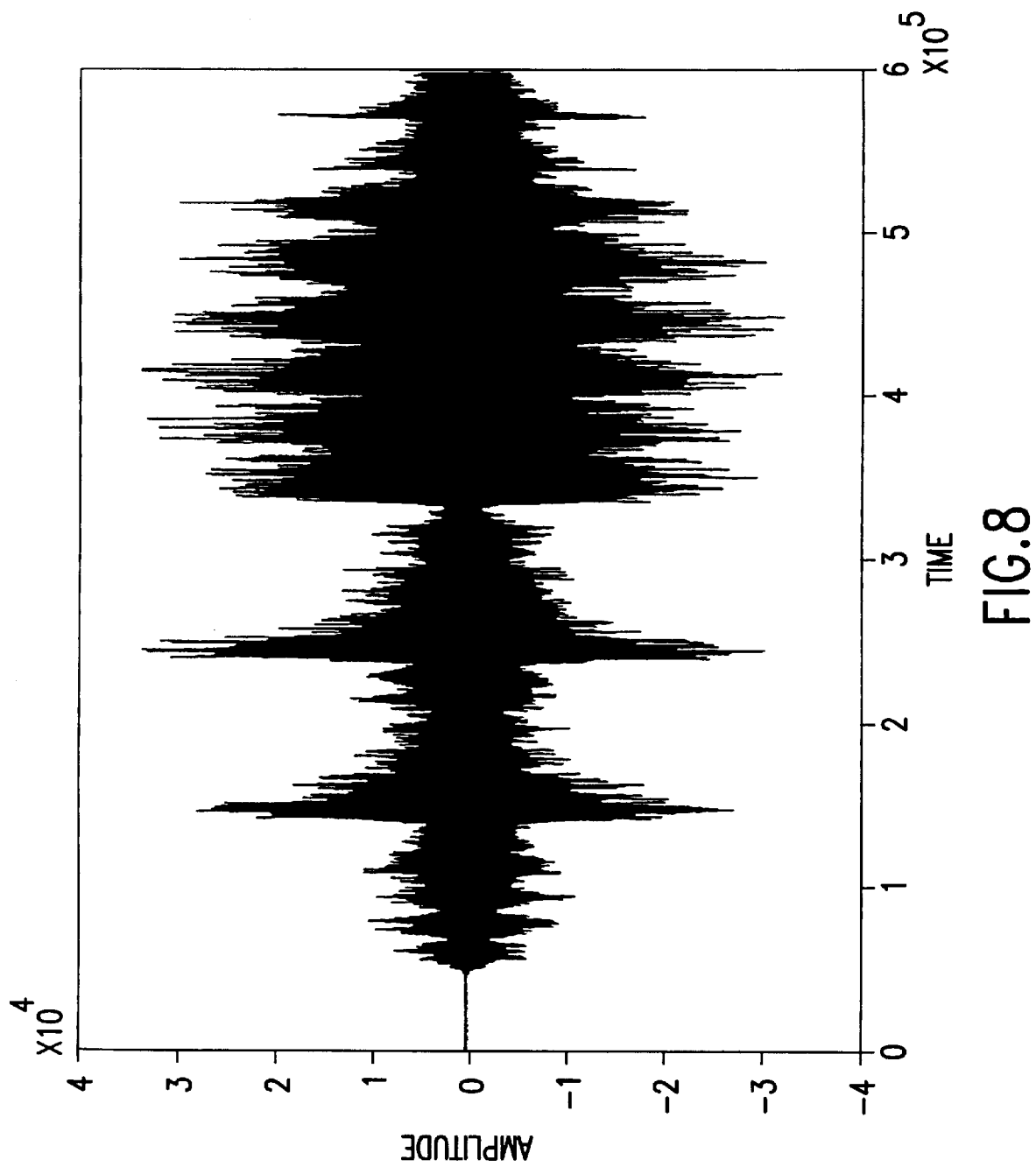
FIG. 8 is the graph of the reconstructed waveform produced by PONS coding of the waveform of FIG. 7 with 4 bit quantization.

We have processed various sounds with the PONS coder and decoder at various levels of quantization. For example, we have achieved real time 4 to 1 compression of CD quality audio with virtually no perceptible distortion or loss in fidelity with a four bit quantizer. FIG. 7 shows the waveform of fourteen second excerpt from the opening sequence of Tchaikovsky's Piano Concerto No. 1. The data segment used for test is a 16 bit representation sampled at 44.1 KHz. FIG. 8 shows the reconstructed signal after PONS coding, 4 bit quantization, and reconstruction. The reconstructed signal is virtually indistinguishable from the input signal either on comparison of the graphs or on listening to the audio output.

In addition, we have applied the PONS coder to the processing of lower fidelity input signals such as those which are sometimes found inapplicatioc games and multimedia applications. The coding-decoding has given at least 4 to 1 compression with excellent reconstruction. In particular, we have applied PONS coding to the processing of a number signals sampled at 11.025 and 22.05 KHz, as well as at 44.1 KHz, with good results.

We have found observationally in processing these signals that all the transform domain coefficients in a single channel have a bounded dynamic range and all channels have the same dynamic range. And, unlike other bit allocation driven codes, no objectional artifacts were introduced in the reconstruction due to quantization aliasing or clipping. This invention therefore provides a real time method of achieving significant signal compression on general purpose computers, both PC and work station level.

We claim:

1. An apparatus for coding and decoding a stream of univariate discrete-time signal samples comprising
   a. means for accumulating a complete frame of discrete-time samples from a sequential discrete-time signal stream;
   b. an energy spreading block coder the output of which is a frame-sized set of transform coefficients;
   c. means for storing or transmitting a frame-sized set of transform coefficients;
   d. an energy spreading inverse block coder identical to said energy spreading block coder, the input of which is a frame-sized set of transform coefficients and the output of which is a frame-sized set of reconstructed discrete-time signal samples; and
   e. a sequentializer means for converting said frame-sized set of reconstructed discrete time-signal samples to a set of time-sequential reconstructed discrete-time signal samples.

2. The apparatus of claim 1 additionally comprising, at the output side of said energy spreading block coder, means for quantization of all transform domain coefficients with time invariant bit allocation not requiring calculations.

3. An apparatus for coding and decoding a stream of univariate discrete-time signal samples comprising
   a. means for accumulating a complete frame of frame size M of discrete-time samples from a sequential discrete time signal stream, wherein M is selected such that M=$2^n$ and n is an order of decomposition, and for transferring said complete frame of signals to an orthogonal transform block coder upon accumulation of M samples;
   b. a transforming orthogonal transform block coder having an input side and an output side, which coder transforms said complete frame of discrete time samples into a set of M transform domain coefficients, said block coder having as matrix elements the coefficients of a set of polynomials of said decomposition order n, $P_{n,1}(z), P_{n,2}(Z), \ldots, P_{n,M}(z)$, wherein the polynomials of said decomposition order n are obtained from $$P_{1,1}(z)=1+z$$

$$P_{1,2}(z)=1-z$$

by repeated application of the recursion relations

Given $P_{n,m}(z), m=1,2,\ldots,2^n$ for $m=4j+1$, with $j=0,1,2,\ldots,2^{n-1}-1$ define $P_{n+1,m}(z), m=1,2,\ldots,2^{n+1}$ as $$P_{n+1,m}=P_{n,2j+1}+z^{2^n}P_{n,2j+2}$$

$$P_{n+1,m+1}=P_{n,2j+1}-z^{2^n}P_{n,2j+2},$$

$$P_{n+1,m+2}=P_{n,2j+2}+z^{2^n}P_{n,2j+1}$$

$$P_{n+1,m+3}=-P_{n,2j+2}+z^{2^n}P_{n,2j+1}$$

and which outputs said transform domain coefficients to M transform domain coefficient channels;

c. means for transmitting or storing the set of transform domain coefficients;

d. an inverse orthogonal transform block coder with matrix elements identical to the elements of said orthogonal transform block coder, said inverse orthogonal transform block coder producing a frame of reconstructed discrete time signals and transferring said frame of reconstructed discrete time signals to a sequentializer; and e. a sequentializer comprising means for converting said frame of reconstructed discrete time signals into a sequential output signal stream of reconstructed discrete time signal samples.

4. The apparatus of claim 3 additionally comprising, at the output side of said transforming orthogonal transform block coder, means for quantizing all transform domain coefficients with time invariant bit allocation not requiring calculations.

5. The apparatus of claim 4 wherein the means for quantizing all transform domain coefficients without bit allocation comprises means for quantizing transform domain coefficients identically across all channels, whereby the number of bits in each transform domain coefficient is reduced by a predetermined amount which is the same for each channel and whereby a set of M quantized transform domain coefficients is produced.

6. The apparatus of claim 5 in which the means for quantizing all transform domain coefficients uniformly across all channels comprises a bank of identical quantizers in the transform coefficient channels which quantize the transform coefficients produced by the block coder.

7. The apparatus of claim 6 in which the bank of identical quantizers in the transform coefficient channels utilize nonuniform quantization.

8. The apparatus of claim 4 additionally comprising a quantization level calculator which changes the size of the quantization step for quantization of the transform domain coefficients of each frame according to the maximum value of the magnitude of any of the transform domain coefficients for that frame, a quantization level de-adjuster at the output side of the output shift register, and means for transmitting quantization level adjustment from the quantization level calculator to the quantization level deadjuster.

9. The apparatus of claim 5 in which the means for quantizing transform domain coefficients identically across all channels utilizes nonuniform quantization.

10. The apparatus of claim 3 additionally comprising a normalizer whereby a multiplication factor 1/M is applied during processing.

11. The apparatus of claim 10 in which the normalizer applies a multiplication by 1/M to the sequential output signal stream of reconstructed discrete-time samples.

12. The apparatus of claim 3 additionally comprising a quantization level calculator which changes the size of the quantization step for quantization of the transform domain coefficients of each frame according to the maximum value of the magnitude of any of the transform domain coefficients for that frame, a quantization level de-adjuster at the output side of the output shift register, and means for transmitting quantization level adjustment from the quantization level calculator to the quantization level de-adjuster.

13. The apparatus of claim 3 additionally comprising a pre-equalizer applied to the input sequential discrete time signal in the circuit before frame accumulation means, and a de-equalizer applied to the sequential output signal in the circuit after reconstruction of the discrete time samples.

14. The apparatus of claim 3 in which the means for accumulating a complete frame of frame size M of discrete-time samples from a sequential discrete-time signal stream comprises an input shift register and the sequentializer comprises an output shift register.

15. The apparatus of claim 3 in which the orthogonal transform block coder and inverse orthogonal transform block coder are implemented using a tree structured fast algorithm.

16. An apparatus for coding and decoding a sequential stream of univariate discrete time signals comprising a. a pre-equalizer applied to the input sequential discrete time signal stream;

b. an input shift register for accumulating a complete frame of frame size M of discrete-time samples from a sequential discrete time signal, wherein M is such that $M=2^n$, and for transferring said complete frame of signals to an orthogonal transform block coder;

c. an orthogonal transform block coder which transforms said complete frame of discrete time signals into a set of M transform domain coefficients, said block coder having as matrix elements the coefficients of a set of polynomials $P_{n,1}(z), P_{n,2}(z), \ldots, P_{n,M}(z)$, wherein the polynomials of decomposition order n are obtained from $$P_{1,1}(z)=1+z$$

$$P_{1,2}(z)=1-z$$

by repeated application of the recursion relations

Given $P_{n,m}(z), m=1, 2, \ldots, 2^n$ for $m=4j+1$, with $j=0, 1, 2, \ldots, 2^{n-1}-1$ define $P_{n+1,m}(z), m=1, 2, \ldots, 2^{n+1}$ as $$P_{n+1,m}=P_{n,2j+1}+z^{2^n}P_{n,2j+2}$$

$$P_{n+1,m+1}=P_{n,2j+1}-z^{2^n}P_{n,2j+2}$$

$$P_{n+1,m+2}=P_{n,2j+2}+z^{2^n}P_{n,2j+1}$$

$$P_{n+1,m+3}=-P_{n,2j+2}+z^{2^n}P_{n,2j+1}$$

and which outputs said transform domain coefficients to M transform domain coefficient channels;

d. a bank of quantizers with one quantizer in each transform domain coefficient channel, whereby the number of bits in each transform domain coefficient is reduced by a predetermined amount which is the same for each channel and whereby a set of quantized transform domain coefficients is produced;

e. A quantization level calculator which changes the size of the quantization step for quantization of the transform domain coefficients of each frame according to the maximum magnitude value of any of the transform domain coefficients for that frame and a quantization level de-adjuster at the output side of the output shift register;

f. means for transmitting quantization level adjustment from the quantization level calculator to the quantization level de-adjuster;

g. means for transmitting or storing the set of quantized transform domain coefficients;

h. an inverse orthogonal transform block coder with matrix elements obtained by transposing the elements of said orthogonal transform block coder, said inverse orthogonal transform block coder producing a frame of reconstructed discrete time signals and transferring said frame of reconstructed discrete time signals to an output shift register;

i. an output shift register for converting said frame of reconstructed discrete time signals into a sequential output signal stream of reconstructed discrete time samples;

j. a normalizing multiplier applying the multiplication 1/M to the output signal stream; and k. a de-equalizer applied to the output sequential discrete time signal stream.

17. The apparatus of claim 16 in which the quantizer in each transform domain coefficient channel utilizes nonuniform quantization.

18. The apparatus of claim 16 in which the orthogonal transform block coder and inverse orthogonal transform block coder are implemented using a tree structured fast algorithm.

19. An apparatus for coding and decoding a stream of univariate discrete time signals comprising a. A forward filter bank comprising a plurality of channels containing filters in which the filter coefficients comprise the coefficients of a set of polynomials $P_{n,1}(z)$, $P_{n,2}(z), \ldots, P_{n,M}(z)$, wherein the polynomials of decomposition order n are obtained from $P_{1,1}(z)=1+z$ $P_{1,2}(z)=1-z$ by repeated application of the recursion relations Given $P_{n,m}(z)$, $m=1, 2, \ldots, 2^n$ for $m=4j+1$, with $j=0, 1, 2, \ldots, 2^{n-1}-1$ define $P_{n+1,m}(z)$, $m=1, 2, \ldots, 2^{n+1}$ as $P_{n+1,m}=P_{n,2j+1}+z^{2^n}P_{n,2j+2}$ $P_{n+1,m+1}=P_{n,2j+1}-z^{2^n}P_{n,2j+2}$ $P_{n+1,m+2}=P_{n,2j+2}+z^{2^n}P_{n,2j+1}$ $P_{n+1,m+3}=-P_{n,2j+2}+z^{2^n}P_{n,2j+1}$ b. a plurality of decimators corresponding to the filter bank channels;

c. a plurality of quantizers corresponding to the filter bank channels whereby a set of quantized transform domain coefficients is produced;

d. means for transmitting or storing said transform domain coefficients;

e. an inverse filter bank identical to the forward filter bank;

f. an interpolator; and g. a normalizer.

20. The apparatus of claim 19 in which the plurality of quantizers corresponding to the filter bank channels utilize vector or nonuniform quantization.

21. The apparatus of claim 19 in which the forward filter bank and the inverse filter bank are implemented using a tree structured fast algorithm.

22. A method of coding, storing or transmitting, and decoding discrete-time-sampled information carrying electronic signals, comprising the steps of applying energy spreading transform coding to produce a set of non-frequency-based transform coefficients, storing or transmitting said transform coefficients, and applying inverse energy spreading transform coding to said transform coefficients to produce a reconstructed discrete-time-sampled information carrying electronic signal.

23. The method of claim 22 with the additional step comprising quantization in all transform domain channels with time invariant bit allocation not requiring calculations.

* * * * *